(12) United States Patent
Yonezawa et al.

(10) Patent No.: US 8,366,090 B2
(45) Date of Patent: Feb. 5, 2013

(54) CLAMPING DEVICE

(75) Inventors: Keitaro Yonezawa, Kobe (JP); Gaku Yoshimura, Kobe (JP); Yosuke Haruna, Kobe (JP)

(73) Assignee: Kosmek, Ltd., Kobe-Shi, Hyogo ( * ) Notice: Subject to any disclaimer, the term of this patent is extended or adjusted under 35 U.S.C. 154(b) by 1158 days.

(21) Appl. No.: 10/570,892

(22) PCT Filed: Sep. 7, 2004

(86) PCT No.: PCT/JP2004/012971
§ 371 (c)(1),
(2), (4) Date: Mar. 7, 2006

(87) PCT Pub. No.: WO2005/030435
PCT Pub. Date: Apr. 7, 2005

(65) Prior Publication Data
US 2006/0273504 A1    Dec. 7, 2006

(30) Foreign Application Priority Data
Sep. 26, 2003   (JP) ................. 2003-335392

(51) Int. Cl.
*B23Q 3/00* (2006.01)
(52) U.S. Cl. ........................................ 269/309
(58) Field of Classification Search ........... 269/309, 269/310
See application file for complete search history.

(56) References Cited

U.S. PATENT DOCUMENTS

| 6,095,509 A | 8/2000 | Yonezawa |
| 6,161,826 A * | 12/2000 | Forrer ............ 269/309 |
| 6,527,266 B1 * | 3/2003 | Yonezawa et al. ...... 269/309 |
| 2003/0071407 A1 | 4/2003 | Haruna |

FOREIGN PATENT DOCUMENTS

| JP | 54-17580 | 2/1979 |
| JP | 8-155770 | 6/1996 |
| JP | 2003-260624 | 9/2003 |
| JP | 2003-266262 | 9/2003 |
| WO | WO 2003/076110 | 9/2003 |

OTHER PUBLICATIONS

Japanese Office Action issued in JP 2005-514166, Jul. 13, 2010.

(Continued)

*Primary Examiner* — Hadi Shakeri
(74) *Attorney, Agent, or Firm* — Bacon & Thomas, PLLC

(57) ABSTRACT

A plug portion (27) is projected from a first block (1) so as to be inserted into a insertion hole (5) opened in a second block (2). A support surface (9a) is formed on the first block (1) so as to be brought into contact with a supported surface (2a) formed on the second block (2). In the support surface (9a) is opened a fluid flow hole (59). A gap supporting member (K) acting force upon the second block (2) in such a direction as to separate the second block (2) from the first block (1) so as to form a gap (G1) between the supported surface (2a) and the support surface (9a) is provided on the first block (1). A pull member (21) eliminates the gap (G1) by making the second block (2) approach the first block (1) against the force of the gap supporting member (K) in such a condition that an outer peripheral surface of the plug portion (27) is in close contact with an inner peripheral surface of the insertion hole (5) to bring the supported surface (2a) into contact with the support surface (9a).

7 Claims, 11 Drawing Sheets

OTHER PUBLICATIONS

Japanese Office Action issued in JP 2005-514166, Nov. 2, 2010.
Notice of Decision of Final Rejection issued in TW 093127895, Oct. 28, 2010.

Korean Office Action issued in Application No. 10-2006-7005565 dated May 20, 2011.

* cited by examiner

CLAMPING DEVICE

TECHNICAL FIELD

The present invention relates to a clamping apparatus and more particularly relates to an apparatus for clamping a movable member such as a pallet to a reference member such as a table of a machine tool.

BACKGROUND OF THE INVENTION

As such a clamping apparatus, for example, one described below in Patent Document 1 is conventionally available, with the following structure.

A plurality of reference pieces are attached on an upper surface of a jig fixed on a bed of a machine tool. A clamp reference surface for receiving a worked surface of a work piece is formed on an upper surface of each of these reference pieces. A jet hole communicatively connected to a compressed air source is opened upwardly on the clamp reference surface.

Then, when the work piece is clamped, compressed air jetting out upward from the jet hole is used to clean the worked surface of the work piece, thereby preventing swarf from being caught between the worked surface of the work piece and the clamp reference surface.

Patent Document 1: Japanese Published Unexamined Patent Application No. S54-17580

SUMMARY OF THE INVENTION

Problem to be Solved by the Invention

However, in the structure of Patent Document 1, it is impossible to detect whether or not the work piece is properly clamped, namely, the worked surface of the work piece is clamped on the clamp reference surface in a completely close contact condition. For example, foreign matter such as swarf are not completely removed by the compressed air jetted out from the jet hole and caught between the clamp reference surface and the worked surface of the work piece to form a gap therebetween, which cannot be detected.

As a result, machining may be conducted in a condition of the above abnormal clamping. Therefore, machining accuracy may be deteriorated and tools may be broken in an extreme case.

Means for Solving the Problems and Effects

The problems to be solved by the present invention are as described above. Next, an explanation will be made for means for solving the problem and the effects thereof.

(First Invention)

A clamping apparatus of the first invention is constructed as follows, for example, as shown in FIG. 1 through FIG. 3, FIG. 11, FIG. 12, and FIG. 15.

A plug portion 27 is projected from a first block 1 so as to be inserted into a insertion hole 5 opened in a second block 2. A support surface 9a is formed on the first block 1 so as to be brought into contact with a supported surface 2a formed on the second block 2. A fluid flow hole 59 is opened in the support surface 9a. A gap supporting member K is provided on the first block 1 so as to push the second block 2 in such a direction as to separate the second block 2 from the first block 1 and to form a gap G1 between the supported surface 2a and the support surface 9a. A pull member 21 eliminating the gap G1 by making the second block 2 approach the first block 1 against a pushing force of the gap supporting member K in such a condition that an outer peripheral surface of the plug portion 27 is brought into close contact with an inner peripheral surface of the insertion hole 5 in a radial direction.

Accordingly, it is possible to easily detect through detection of a pressure of the fluid flow hole 59 an abnormal clamping such as a case where the second block is clamped, with foreign matter, for example, swarf, caught between the support surface 9a and the supported surface 2a.

Namely, in an unclamped condition, the gap G1 is formed between the supported surface 2a and the support surface 9a by the gap supporting member K. In contrast, in a clamped condition, the pull member 21 eliminates the gap G1 so that the supported surface 2a can be brought into contact with the support surface 9a. It is, therefore, possible to judge easily whether the second block is in a clamped condition or in an unclamped condition by detecting the pressure of the fluid flow hole 59.

(Second Invention)

In the first invention, it is preferable to provide the following construction, for example, as shown in FIG. 2, FIG. 11, FIG. 12 and FIG. 15.

The first block 1 is arranged below the second block 2. The gap supporting member K forms the gap G1 between the supported surface 2a and the support surface 9a by supporting a weight of the second block 2.

Accordingly, in an unclamped condition, the weight of the second block 2 will act thereon, however, in spite of the weight, the gap supporting member K operates to form the gap G1 between the supported surface 2a and the support surface 9a. Therefore, it is possible to judge easily whether the second block is in a clamped condition or in an unclamped condition by detecting the pressure of the fluid flow hole 59.

(Third Invention)

In the first invention, it is preferable to provide the construction in such a way that pressurized fluid is jetted out from the fluid flow hole 59, for example, as shown in FIG. 1 through FIG. 3, FIG. 11, FIG. 12 and FIG. 15.

Accordingly, since in an unclamped condition the gap supporting member K forms the gap G1 between the supported surface 2a and the support surface 9a, there is no pressure rise even when pressurized fluid is supplied to the fluid flow hole 59. In contrast, since in a clamped condition the pull member 21 eliminates the gap G1 so that the supported surface 2a is brought into contact with the support surface 9a, there is pressure rise in the fluid flow hole 59. Therefore, it is possible to judge easily whether the second block is in a clamped condition or in an unclamped condition by detecting the pressure of the fluid flow hole 59.

(Fourth Invention)

The first invention can be constructed in such a way that air is sucked into the fluid flow hole 59.

Accordingly, since the gap supporting member K forms the gap G1 between the supported surface 2a and the support surface 9a in an unclamped condition, the pressure will not be decreased even when air is sucked into the fluid flow hole 59. In contrast, since the pull member 21 eliminates the gap G1 so that the supported surface 2a comes into contact with the support surface 9a in a clamped condition, the pressure is decreased at the fluid flow hole 59. Therefore, it is possible to judge easily whether the second block is in a clamped condition or in an unclamped condition by detecting the pressure of the fluid flow hole 59.

(Fifth Invention)

In the first invention, it is preferable that an elastic member 25 is employed as the gap supporting member K, for example, as shown in FIG. 1 through FIG. 3, FIG. 11 and FIG. 12.

Accordingly, in an unclamped condition, the elasticity of the elastic member 25 is utilized to form the gap G1 between the supported surface 2a and the support surface 9a, thereby making it possible to provide a mechanically simple clamping apparatus.

(Sixth Invention)

In the first invention, a piston 76 driven by pressurized fluid is employed as the gap supporting member K, for example, as shown in FIG. 15.

Accordingly, the force acting on a direction to separate the second block 2 from the first block 1 can be easily controlled by adjusting the pressure of the pressurized fluid in order to form the gap G1 between the supported surface 2a and the support surface 9a in an unclamped condition.

(Seventh Invention)

In the first invention, it is preferable that a flange portion 69 which comes into contact with a circumference of an opening end of the insertion hole 5 opened in the second block 2 and transmits the pushing force of the gap supporting member K to the second block 2, for example, as shown in FIG. 11, FIG. 12 and FIG. 15.

Accordingly, it is possible to provide a reliable transmission of the force of the gap supporting member K to the second block 2 in a compact structure. Further, since the flange portion 69 is constructed so as to come into contact with the circumference of the opening end of the insertion hole 5, the insertion hole 5 can be made simple in shape. In addition, a direct contact of the gap supporting member K with the second block 2 can be prevented, thereby making it possible to protect the gap supporting member K and increase the life.

(Eighth Invention)

In the first invention, the gap supporting member K is allowed to come into contact with a circumference of an opening end of the insertion hole 5 opened in the second block 2, for example, as shown in FIG. 4.

Accordingly, the gap supporting member K is constructed so as to make a direct contact with the circumference of the opening end of the insertion hole 5 and provide a force acting on a direction to separate the second block 2 from the first block 1, thereby making it possible to simplify the structure and reduce the number of components.

(Ninth Invention)

In the first invention, it is preferable that when the outer peripheral surface of the plug portion 27 comes into close contact with the inner peripheral surface of the insertion hole 5, the second block 2 is positioned with respect to the first block 1 in a radial direction of the plug portion 27, for example, as shown in FIG. 1 through FIG. 3.

Accordingly, when the second block 2 is clamped with respect to the first block 1 in an axial direction of the plug portion 27, positioning is made in a radial direction of the plug portion 27. It is, therefore, possible to provide a mechanically simple and compact clamping apparatus having a positioning function.

(Tenth Invention)

In the first invention, the plug portion 27 is allowed to move radially with respect to the first block 1, as shown in FIG. 11, FIG. 12 and FIG. 15.

Accordingly, when the second block 2 is clamped with respect to the first block 1 in an axial direction of the plug portion 27, axial misalignment of the insertion hole 5 with the plug portion 27 is allowed.

(Eleventh Invention)

In the first invention, it is preferable to provide the following construction, for example, as shown in FIG. 1 through FIG. 3, FIG. 11, FIG. 12 and FIG. 15.

The plug portion 27 is provided with an outer member (71, 78) having an inclined inner surface 17 vertically movably. The pull member 21 is adapted to make the second block 2 approach the first block 1 via the outer member (71, 78) and the insertion hole 5, radially expanding the outer member (71, 78) to make the outer member (71, 78) come into close contact with the insertion hole 5 by a tapering engagement of the inclined inner surface 17.

Accordingly, the outer member (71, 78) is radially expanded due to the tapering engagement and brought into close contact with the insertion hole 5 and the second block 2 is made to approach the first block 1 by the friction force and plastic deformation force resulting from the close contact, thereby making it possible to provide a reliable clamping and also simply construct the clamping apparatus and the insertion hole 5.

Further, in a clamped condition, of six surfaces of the second block 2, five surfaces excluding the surface opposing the first block 1 can be accessed to provide a better workability.

(Twelfth Invention)

In the eleventh invention, it is preferable that the gap supporting member K also serves as a means for holding the outer member 78 at a leading end position, for example, as shown in FIG. 12 and FIG. 15.

Accordingly, it is not necessary to provide in particular a means for holding the outer member 78 at a leading end position, thereby making it possible to simplify the structure of the clamping apparatus and reduce the number of components.

(Thirteenth Invention)

In the eleventh invention, it is possible that the gap supporting member K also serves as a means for holding a member (61, 68) having an inclined outer surface 13 allowed to make a tapering engagement with the inclined inner surface 17 of the outer member (71, 78) at a leading end position, for example, as shown in FIG. 1 through FIG. 3 and FIG. 11.

Accordingly, it is not necessary to provide in particular a means for holding the member (61, 68) having the inclined outer surface 13 at a leading end position, thereby making it possible to simplify the structure of the clamping apparatus and reduce the number of components.

DESCRIPTION OF SYMBOLS

Figure 1:
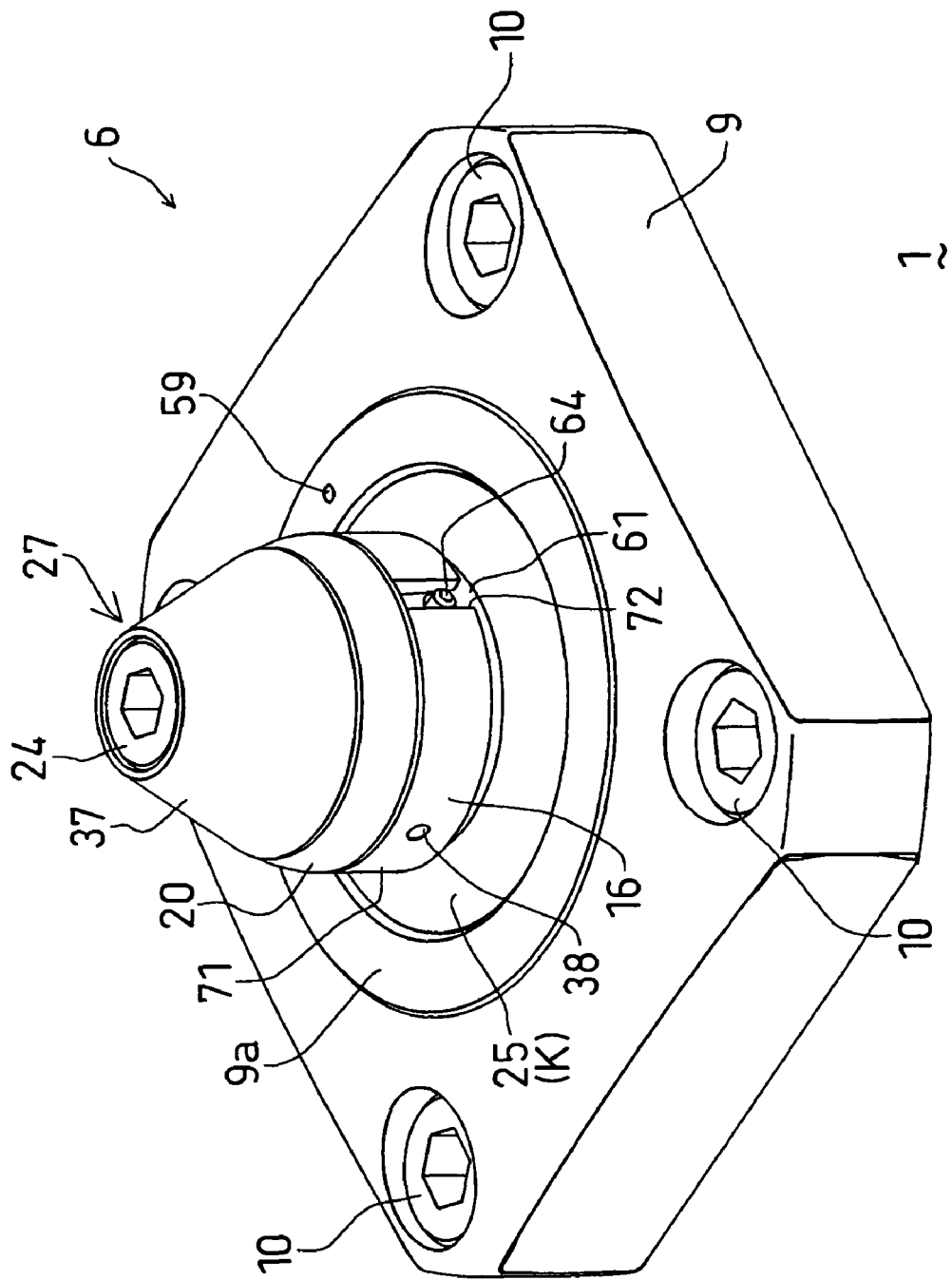
FIG. 1 is a perspective view of a plug means of a clamping apparatus in a first embodiment of the present invention.

1: base plate (first block)
2: pallet (second block)
2a: supported surface
9a: support surface
21: pull member
25: coned disc spring (elastic member)
59: detection nozzle hole (fluid flow hole)
61: inner sleeve (inner member)
68: inner engaging member (inner member)
69: flange portion
71: outer sleeve (outer member)
76: push-up piston
78: outer engaging member (outer member)
G1: gap
K: gap supporting member

BEST MODE FOR CARRYING OUT THE INVENTION

First Embodiment

FIG. 1 through FIG. 9 illustrate a first embodiment of the clamping apparatus according to the present invention.

First, an explanation will be made for the construction of the clamping apparatus by referring to FIG. 1 through FIG. 3.

FIG. 1 is a perspective view of a plug means 6 of the clamping apparatus. FIG. 2 is an elevational sectional view illustrating an unclamped condition of the clamping apparatus and FIG. 3 is a sectional view indicated by the arrow 3-3 in FIG. 2.

Figure 2:
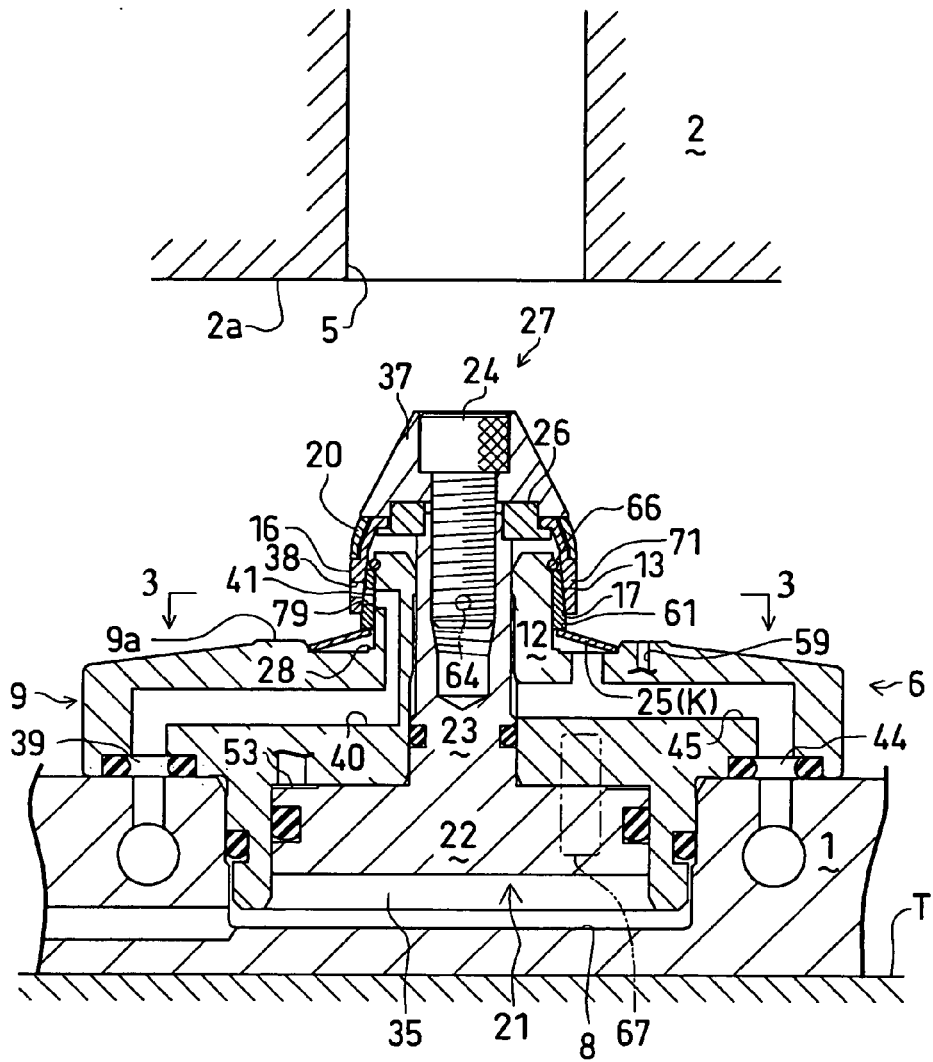
FIG. 2 is an elevational sectional view illustrating an unclamped condition of the clamping apparatus.

As illustrated in FIG. 2, a base plate 1 as a first block is placed on a table T of a machine tool, and a housing 9 is fixed on the base plate 1 (refer to FIG. 1). A support surface 9a is formed on an upper surface of the housing 9 and the support surface 9a is adapted to receive a supported surface 2a of a pallet 2 as a second block. Then, when the supported surface 2a is received on the support surface 9a, the pallet 2 is horizontally positioned in a condition that the base plate 1 and the pallet 2 are mutually aligned.

As illustrated in FIG. 2, the supported surface 2a is formed on a lower surface of the pallet 2. Further, on the lower surface of the pallet 2 are opened a plurality of circular insertion holes 5. A plug means 6 is provided on the base plate 1, corresponding to each of the holes 5. In FIG. 2 and FIG. 3, only one set of the insertion hole 5 and the plug means 6 is illustrated, although they are actually provided in plural sets.

An explanation will be made as follows for the construction of the plug means 6. As illustrated in FIG. 2, on an upper surface of the base plate 1 is opened an installation hole 8. The housing 9 inserted into the installation hole 8 is fixed to the base plate 1 by using a tightening bolt 10 (refer to FIG. 1). As illustrated in FIG. 2, on the housing 9 is integrally formed an annular central pillar 12 in an upwardly projected way. The central pillar 12 is adapted so as to be inserted into the insertion hole 5 of the pallet 2. The central pillar 12 is in substantial alignment with the installation hole 8. Further, an outer peripheral surface of the central pillar 12 is formed into a straight manner.

As illustrated in FIG. 1 and FIG. 2, at an outer periphery position of a lower end of the central pillar 12 is annularly projected an upper surface of the housing 9 to a slight extent. A flat surface of a projected part forms the support surface 9a. As illustrated in FIG. 2, the support surface 9a is opposed to the supported surface 2a of the pallet 2.

On the central pillar 12 is fitted an inner sleeve 61 as an inner member. The inner sleeve 61 is movable within a predetermined range in an axial (vertical) direction of the central pillar 12. As illustrated in FIG. 3, on a circumferential wall of the inner sleeve 61 is formed one slit 62 extending vertically. The inner sleeve 61 is adapted to expand and contract in a radial direction with the slit 62. When a diametrically contracting force applied to the inner sleeve 61 is released, the inner sleeve 61 can diametrically expand due to its own elastic restoring force.

Figure 3:
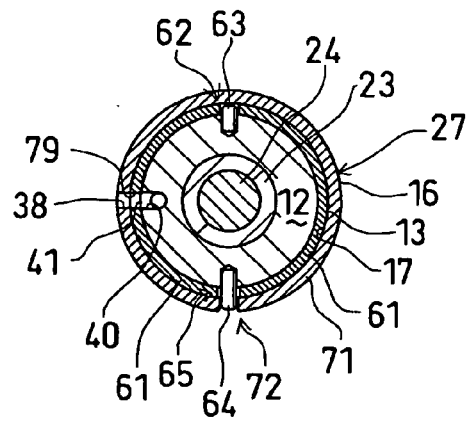
FIG. 3 is a sectional view indicated by the arrow 3-3 in FIG. 2.

As illustrated in FIG. 3, two stopper pins 63, 64 are projected in a radial direction from the outer peripheral surface of the central pillar 12. An outer end of the first stopper pin 63 is inserted into the slit 62. An outer end of the second stopper pin 64 is inserted into a loose hole 65 opened in the inner sleeve 61. It is preferable to attach a sealing member (not illustrated) such as rubber to the slit 62.

As illustrated in FIG. 2, between the inner sleeve 61 and the housing 9 is arranged a coned disc spring (elastic member) 25. The coned disc spring 25 urges the inner sleeve 61 upward. Further, the coned disc spring 25 also serves as a gap supporting member K for receiving a weight of the pallet 2, the details of which will be explained later.

On an upper part of the central pillar 12 is fitted a retaining ring 66. The retaining ring 66 is adapted so as to receive an upper end of the inner sleeve 61. The retaining ring 66 serves to prevent an elevation of the inner sleeve 61, which is greater than a predetermined distance, thereby specifying an upper end of a moving stroke of the inner sleeve 61.

At a lower end of the central pillar 12 is formed an annular projection 28. The coned disc spring 25 is not compressed to an extent greater than a predetermined extent by allowing an inner periphery of the coned disc spring 25 to come into contact with the annular projection 28. As a result, a lower end of the moving stroke of the inner sleeve 61 is specified. Further, the annular projection 28 also serves to prevent an excessive compression of the coned disc spring 25 and also an inversion of the coned disc spring 25.

On an outer periphery of the inner sleeve 61 is provided an inclined outer surface 13. The inclined outer surface 13 is formed so as to gradually get closer to an axis upward (toward a leading end of the central pillar 12).

Outside the inner sleeve 61 is arranged an annular outer sleeve 71 as an outer member. The outer sleeve 71 is formed into a collet shape and also in an substantially cylindrical shape. On a peripheral wall of the outer sleeve 71 is formed one slit 72 extending vertically. The outer sleeve 71 is allowed to diametrically expand and diametrically contract with this slit 72. It is noted that, when a diametrically expanding force applied to the outer sleeve 71 is released, the outer sleeve 71 is allowed to diametrically contract by its own elastic restoring force.

Into the slit 72 of the outer sleeve 71 is inserted an outer end of the second stopper pin 64, which prevents the outer sleeve 71 from rotating. It is preferable to attach a sealing member (not illustrated) such as rubber to the slit 72.

On an outer peripheral surface of the outer sleeve 71 is formed a straight outer surface 16 allowed to come into close contact with an inner peripheral surface of the insertion hole 5. In contrast, on an inner surface of the outer sleeve 71 is formed an inclined inner surface 17 which is opposed to the inclined outer surface 13 of the inner sleeve 61. The inclined inner surface 17 is also formed so as to gradually get closer to the axial upward (toward the leading end of the central pillar 12), as with the inclined outer surface 13.

Inside the housing 9 is inserted a pull member 21 vertically movably. The pull member 21 is provided with a piston 22 hermetically inserted into a lower part of the housing 9, a piston rod 23 projected integrally upward from the piston 22 and also inserted into a cylindrical hole of the central pillar 12, a cap 37 fixed on an upper part of the piston rod 23 by a bolt 24, and a ring 26 attached between a lower surface of the cap 37 and an upper end surface of the piston rod 23. On an outer peripheral surface of the ring 26 is formed a collar portion, and into an annular groove formed by the collar portion and the cap 37 is fitted an upper flange formed on an upper part of the outer sleeve 71. As a result, the outer sleeve 71 is connected to the pull member 21.

In the present embodiment, the plug portion 27 includes the central pillar 12, the cap 37, the inner sleeve 61, the outer sleeve 71 and the like. The plug portion 27 is projected from the base plate 1 so as to be inserted into the insertion hole 5. Then, the straight outer surface 16 of the outer sleeve 71 forms an outer peripheral surface of the plug portion 27.

At an upper side of the straight outer surface 16, an outer ring 20 is fitted outside the outer sleeve 71. The outer ring 20 is formed in a seamless manner, thereby foreign matter such as swarf is prevented from entering inside of the plug portion 27 via the slit 72 and the like.

Inside the housing 9 are provided a lock means (clamp means) and a release means (unclamp means). Of these means, the lock means includes the piston 22 and a hydraulic chamber 53 for locking formed on an upper side of the piston 22. The release means includes the piston 22 and a hydraulic chamber 35 for releasing formed on a lower side of the piston 22.

It is noted that, as illustrated by a chain line line in FIG. 2, a lower end of a pin 67 is inserted into the piston 22, while an upper end thereof is locked by the housing 9. The pin 67 serves to prevent the pull member 21 from rotating.

The housing 9 is provided with an air supply port 39. This air supply port 39 is connected to an air passage 40 formed inside the housing 9. An upper end of the air passage 40 forms a relay opening 41 opened on the outer peripheral surface of the central pillar 12. The relay opening 41 is communicatively connected to a jet hole 38 opened in the outer sleeve 71 via a communication hole 79 opened in the inner sleeve 61 in a penetrating manner.

On the support surface 9a of the housing 9 is provided a seating confirmation means. More specifically, in the support surface 9a is opened a detection nozzle hole 59 as a fluid flow hole, and to this detection nozzle hole 59 is supplied compressed air for detection. In such a construction as explained above, when the supported surface 2a comes into contact with the support surface 9a, the detection nozzle hole 59 is closed by the supported surface 2a, thereby the pressure rises. By detecting this pressure rise using a pressure sensor (not illustrated), it is possible to confirm that the pallet 2 is seated on the housing 9.

The housing 9 is provided with a cleaning means. More specifically, the housing 9 is provided with a cleaning port 44, and the cleaning port 44 is connected to a cleaning passage 45. Then, when compressed air is supplied to the cleaning port 44, the compressed air is blown to the coned disc spring 25, the inner sleeve 61, the outer sleeve 71, the inner peripheral surface of the insertion hole 5 and the like via the cleaning passage 45 and jet holes (not illustrated). As a result, foreign matter such as swarf attached on individual parts can be blown away and removed.

Next, an explanation will be made for operation of the plug means 6 of the present embodiment by referring to FIG. 2, FIG. 3, and FIG. 4 through FIG. 9.

In the unclamped condition as illustrated in FIG. 2 and FIG. 3, pressurized oil in the hydraulic chamber 53 for locking has been discharged, and pressurized oil has been supplied to the hydraulic chamber 35 for releasing. Thereby, the piston 22 has ascended and the outer sleeve 71 has also ascended. As a result, the condition of the outer sleeve 71 has been switched into a contracted condition. Further, the inner sleeve 61 has elevated by an advancing stroke by the coned disc spring 25. In the unclamped condition, the inner sleeve 61 makes a slight tapering engagement with the outer sleeve 71 or faces the outer sleeve 71 with a small gap left therebetween.

In this unclamped condition, the pallet 2 is lowered by some elevating means or its own weight and the outer sleeve 71 is inserted into the insertion hole 5. Further, in the descending operation, it is preferable that compressed air is supplied to the cleaning port 44 to blow and remove swarf and the like which are attached on respective parts of the plug portion 27.

Figure 4:
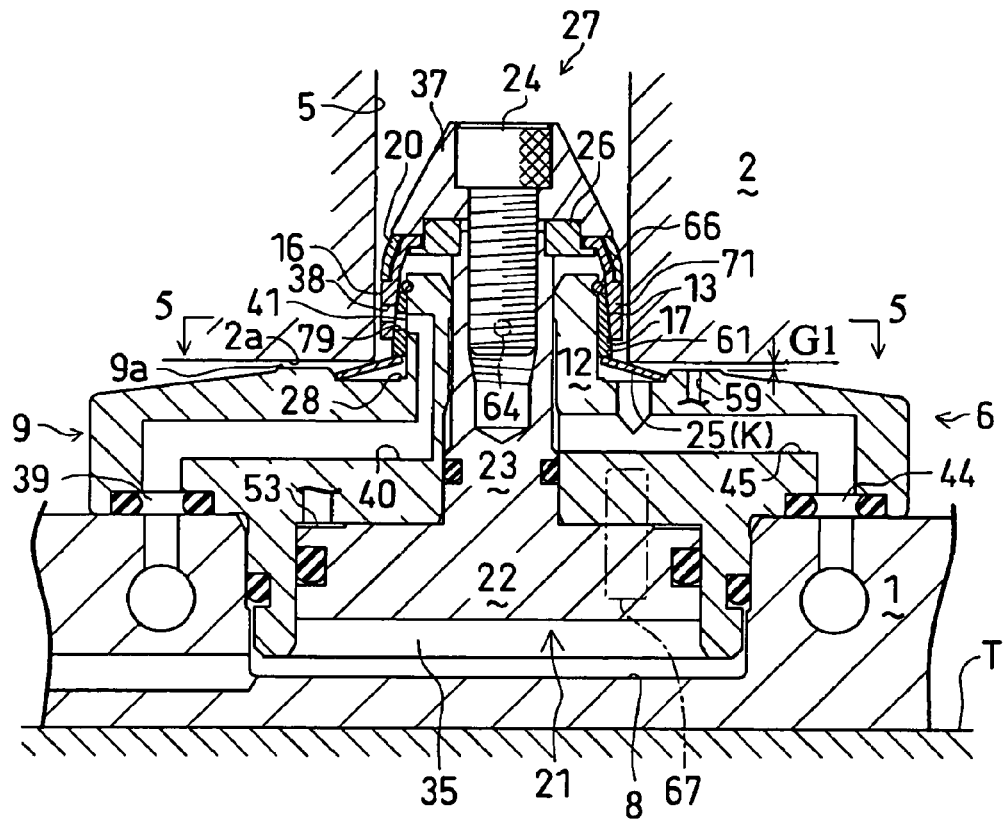
FIG. 4 is an elevational sectional view illustrating a condition where a pallet is lowered from the condition in FIG. 2 and placed on a coned disc spring to form a gap between a support surface and a supported surface.
Figure 5:
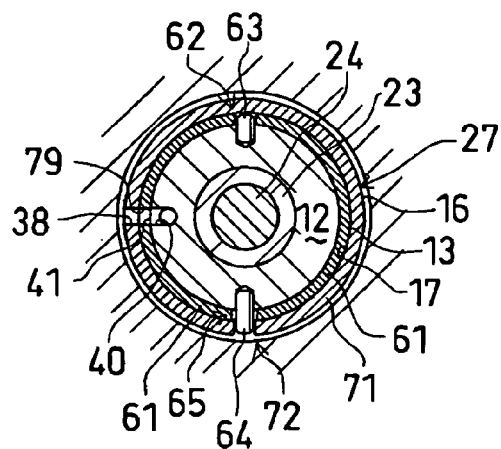
FIG. 5 is a sectional view indicated by the arrow 5-5 in FIG. 4.

As illustrated in FIG. 4, the weight of the pallet 2 is received by the coned disc spring 25 in a condition that a slight gap G1 is formed between the supported surface 2a and the support surface 9a according to the descent of the pallet 2. Therefore, even though compressed air is supplied to the detection nozzle hole 59 in this condition, pressure does not rise due to air leakage from the gap G1.

Thereafter, the pressurized oil is discharged from the hydraulic chamber 35 for releasing and also pressurized oil is supplied to the hydraulic chamber 53 for locking. Then, the piston 22 lowers the outer sleeve 71 via the piston rod 23 and the cap 37, allowing the inclined inner surface 17 of the outer sleeve 71 to make a wedge-engagement with the inclined outer surface 13 of the inner sleeve 61. Thereby, the outer sleeve 71, the inner sleeve 61 and the like will operate as follows.

Figure 6:
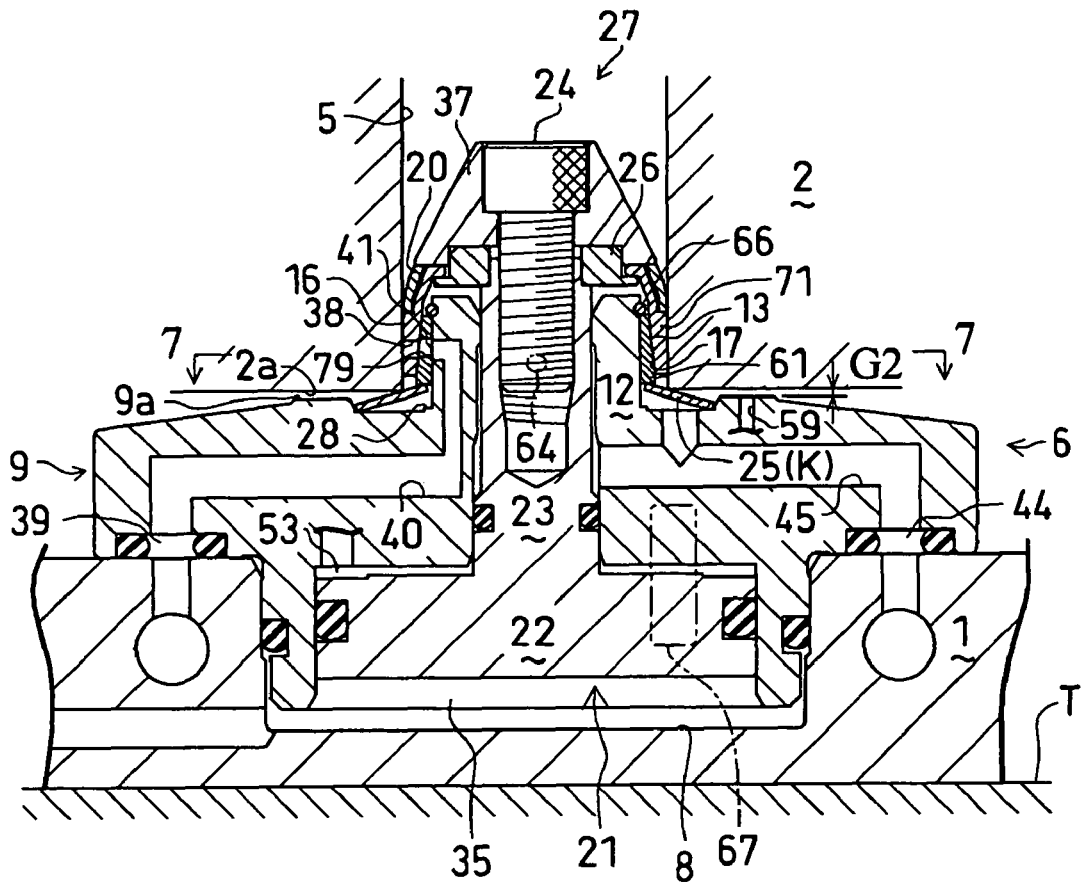
FIG. 6 is an elevational sectional view illustrating a condition where clamping is conducted from the condition in FIG. 4, by which an outer peripheral surface of a plug portion of the plug means comes into strong and close contact with an inner peripheral surface of a insertion hole.
Figure 7:
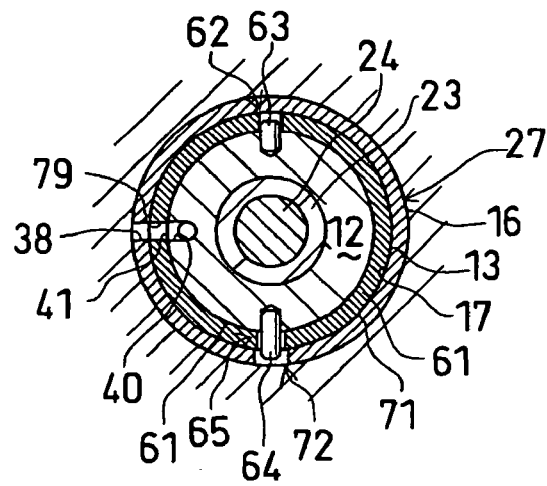
FIG. 7 is a sectional view indicated by the arrow 7-7 in FIG. 6.

First, the outer sleeve 71 diametrically expands via the inner sleeve 61 held substantially at a raised position (on the leading end position) by means of an urging force of the coned disc spring 25, and the outer sleeve 71 comes into contact with the insertion hole 5. Thereafter, the outer sleeve 71 expands radially while compressing the coned disc spring 25 downward via the inner sleeve 61 and comes into close contact with the inner peripheral surface of the insertion hole 5. Thereby, the pallet 2 is positioned horizontally (FIG. 6 and FIG. 7). In the thus realized horizontal positioning stage, as illustrated in FIG. 6, a contacting gap G2 is formed between the support surface 9a and the supported surface 2a.

Figure 8:
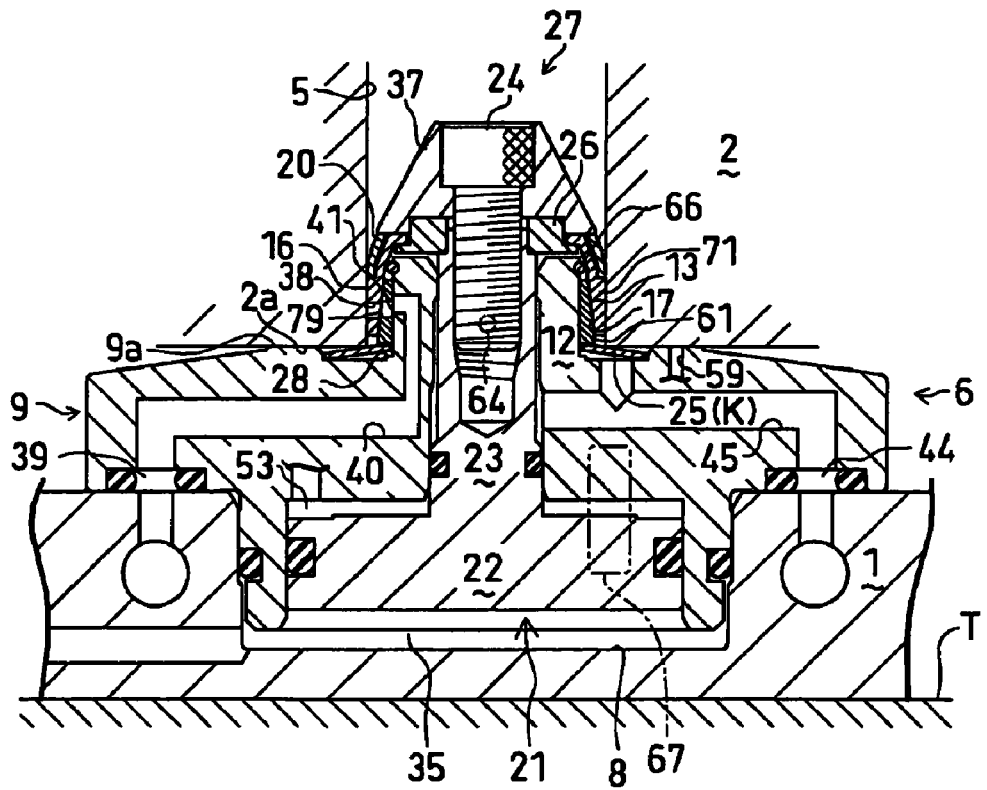
FIG. 8 is an elevational sectional view illustrating a condition where clamping is continued from the condition in FIG. 6, and the plug portion that is in a strong and close contact with the hole pulls the pallet downward to make the supported surface come into contact with the support surface.

Successively, the outer sleeve 71 which is in close contact with the inner peripheral surface of the insertion hole 5 pulls the pallet 2 downward via the insertion hole 5, and at the same time the outer sleeve 71 makes the inner sleeve 61 descend against the urging force of the coned disc spring 25. Thereby, the supported surface 2a of the pallet 2 comes into contact with the support surface 9a of the housing 9 and the supported surface 2a is pressed to the support surface 9a (FIG. 8).

Figure 9:
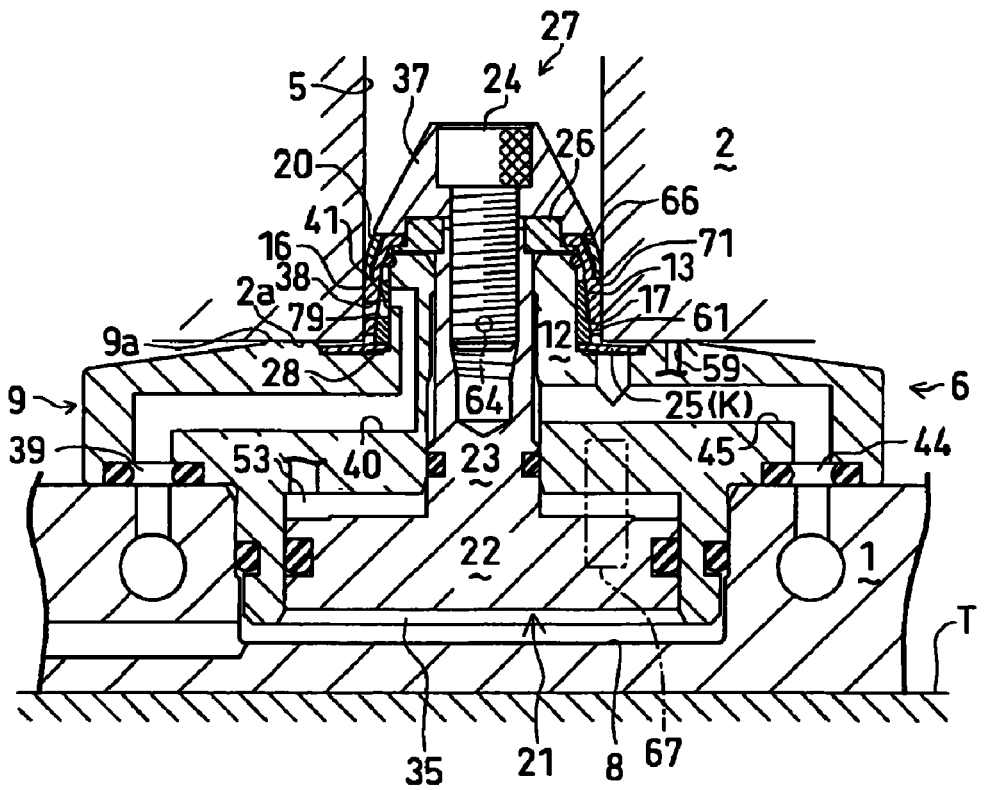
FIG. 9 is an elevational sectional view illustrating a condition where clamping is further continued from the condition in FIG. 8, and the outer peripheral surface of the plug portion comes into strong and close contact with the insertion hole.

Thereafter, with respect to the insertion hole 5 of the pallet 2, the descent of which is prevented by the support surface 9a, the outer sleeve 71 will descend with a frictional slide. Then, when the outer sleeve 71 lowers the inner sleeve 61 by a distance corresponding to the advancing stroke against the urging force of the coned disc spring 25, as illustrated in FIG. 9, the coned disc spring 25 comes into contact with the annular projection 28, thereby preventing further compression, and the inner sleeve 61 is received by the housing 9 via the coned disc spring 25. Then, the outer sleeve 71 is strongly wedge-engaged with the inner sleeve 61 to diametrically expand, and the outer sleeve 71 comes into strong and close contact with the inner peripheral surface of the insertion hole 5. As a result, the pallet 2 is restricted horizontally and vertically and locked strongly. Then, in the clamped condition, a gap between the support surface 9a and the supported surface 2a is completely eliminated or minimized, and the pressure rises upon supply of compressed air to the detection nozzle hole 59.

Additionally, when the clamped condition is switched into the unclamped condition, the pressurized oil in the hydraulic chamber 53 for locking is discharged and also pressurized oil is supplied to the hydraulic chamber 35 for releasing. Thereby, the pull member 21 including the piston 22, the piston rod 23 and the cap 37 raises the outer sleeve 71, and the raised outer sleeve 71 diametrically contracts due to its own elastic restoring force, resulting in release of the clamped condition.

Since the clamping apparatus of the present embodiment operates as explained above, by detecting the pressure at the detection nozzle hole 59, it is possible to conduct an appropriate judgment of the clamped condition.

Namely, in the unclamped condition of FIG. 4, on the assumption that the supported surface 2a of the pallet 2 is adapted to come into contact with the support surface 9a, despite the fact that the plug means 6 is in the unclamped condition, the detection nozzle hole 59 is closed by the supported surface 2a, as with the clamped condition. Therefore, it is difficult to judge whether or not the pallet 2 is clamped only by supplying compressed air to the detection nozzle hole 59 to detect the pressure thereof.

In this respect, in the present embodiment, as given in the unclamped condition of FIG. 4, the coned disc spring 25 as the gap supporting member K allows force in the direction of separating the pallet 2 from the base plate 1 to act on the pallet 2, supporting the weight of the pallet 2, thereby forming the gap G1 between the support surface 9a and the supported surface 2a. In contrast, in the clamped condition, the gap G1 is disappeared by actuating the pull member 21 hydraulically, and the supported surface 2a can be brought into contact with the support surface 9a. Therefore, the present embodiment can be constructed in such a way that the pressure does not rise in an unclamped condition but it is increased in a clamped condition, when compressed air is supplied to the detection nozzle hole 59. As a result, it is possible to judge easily and reliably whether the pallet 2 is in an unclamped condition or in a clamped condition.

In particular, in the present embodiment where the pallet 2 is located on the upper side of the base plate 1 and the pallet 2 is lowered to bring the supported surface 2a into contact with the support surface 9a, the weight acting on the pallet 2 is received by the coned disc spring 25, thereby forming the gap G1 between the supported surface 2a and the support surface 9a reliably. Therefore, the embodiment can be constructed in such a way that compressed air is reliably leaked from the detection nozzle hole 59 in the unclamped condition, thereby avoiding a wrong judgment that the pallet 2 is in a clamped condition although it is actually in an unclamped condition.

Further, the present embodiment is constructed in such a way that in the above clamped condition, the detection nozzle hole 59 is closed by the supported surface 2a and the jet hole 38 is also closed by the inner peripheral surface of the insertion hole 5. Therefore, it is possible to judge easily whether or not the horizontal positioning is made reliably by supplying compressed air to the air supply port 39 and detecting the pressure thereon.

It is noted that, instead of jetting of compressed air from the detection nozzle hole 59, the present embodiment may be constructed in such a way that the detection nozzle hole 59 is made negative by using a vacuum pump and the like to suck air into the detection nozzle hole 59. In this instance, the supported surface 2a comes into close contact with the support surface 9a, thereby decreasing the pressure of the detection nozzle hole 59, which can be detected by a pressure sensor and the like to detect the pallet 2 being in a clamped condition.

In the present embodiment, the coned disc spring (elastic member) 25 is used as the gap supporting member K. In the unclamped condition, the gap G1 is formed between the supported surface 2a and the support surface 9a due to the elastic action of the coned disc spring 25, thereby making it possible to provide a mechanically simple clamping apparatus.

Further, the present embodiment is constructed in such a way that the coned disc spring 25, which is used as the gap supporting member K, makes a direct contact with a periphery of an opening end of the insertion hole 5, thereby receiving the weight of the pallet 2, and making it possible to simplify the structure and reduce the number of components.

In addition, the present embodiment is constructed in such a way that the pallet 2 is positioned in a radial direction of the plug portion 27 with respect to the base plate 1, when the outer peripheral surface (the straight outer surface 16) of the plug portion 27 comes into close contact with the inner peripheral surface of the insertion hole 5. It is, therefore, possible to provide a mechanically simple and compact clamping apparatus having the positioning function.

Furthermore, in the present embodiment, the plug portion 27 is provided with the outer sleeve 71 having the inclined inner surface 17 vertically movably. The present embodiment is also constructed in such a way that the pull member 21 makes a tapering engagement of the inclined inner surface 17 to expand the outer sleeve 71, while the straight outer surface 16 is allowed to come into close contact with the insertion hole 5 and the pallet 2 is approached to the base plate 1 via the outer sleeve 71 and the insertion hole 5.

Therefore, the present embodiment is constructed so that the outer sleeve 71 diametrically expands, due to the tapering engagement, to come into close contact with the insertion hole 5 and the pallet 2 is approached to the base plate 1 by the friction force, thereby making it possible to provide a reliable clamping and also simplify the structure of the clamping apparatus and the insertion hole 5. Further, in a condition that the pallet 2 is clamped, of six surfaces of the pallet 2 in vertical and longitudinal directions, five surfaces excluding the lower surface can be approached to improve the workability.

The present embodiment is also constructed so as to have the inner sleeve 61 which is engaged with the outer sleeve 71. Then, the coned disc spring 25, which is used as the gap supporting member K, also serves to hold the inner sleeve 61 at the leading end position, removing the necessity for providing a special means for supporting the inner sleeve 61 at the leading end in separation from the coned disc spring 25, thereby making it possible to provide a mechanically simple clamping apparatus and reduce the number of components.

Next, an explanation will be made for other plurality of embodiments of the present invention by referring to FIG. 10 through FIG. 15. In these embodiments, the members which are the same or similar to those used in the first embodiment are given the same reference numeral as a rule.

Second Embodiment

Figure 10:
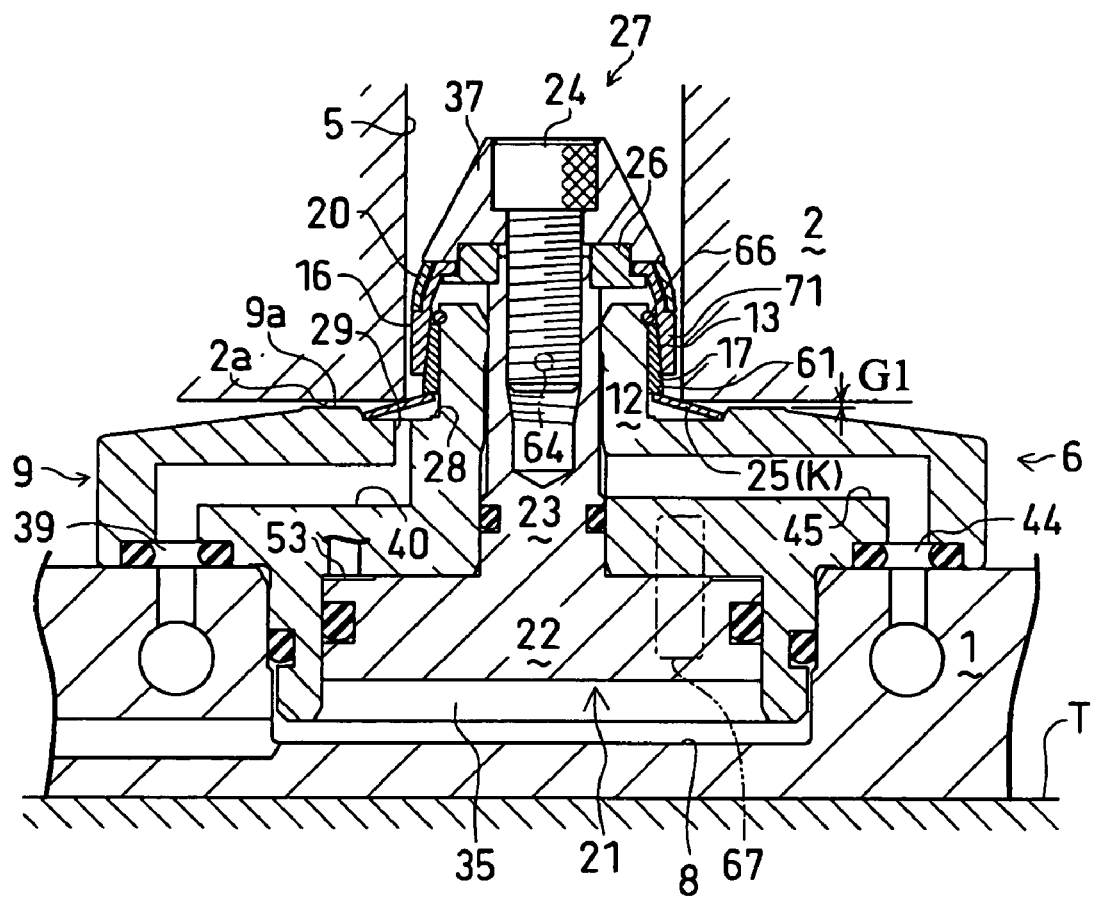
FIG. 10 is an elevational sectional view of the clamping apparatus in a second embodiment and similar to FIG. 4.

FIG. 10 is an elevational sectional view of the clamping apparatus in a second embodiment, illustrating a condition corresponding to that of FIG. 4 in the first embodiment. The second embodiment is different from the first embodiment in the following points.

The second embodiment is constructed in such a way that at an outer periphery of a lower end of the central pillar 12 is opened a detection hole 29, and an upper side of the detection hole 29 is covered by the coned disc spring 25. The detection hole 29 is connected to the air supply port 39 via the air passage 40.

In the unclamped condition of FIG. 10, the coned disc spring 25 raises the inner sleeve 61 and also receives the lower surface of the pallet 2, resulting in that a slight gap G1 is formed between the supported surface 2a and the support surface 9a. At this moment, a large gap is also formed between the annular projection 28 and the coned disc spring 25. Therefore, in the condition of FIG. 10, even when compressed air is supplied to the detection hole 29 via the air supply port 39, the compressed air passes through the large gap, the slit 62 of the inner sleeve 61 (not illustrated here, and refer to FIG. 5) and the gap G1 and leaks outside, resulting in no rising of the pressure.

In the above-described unclamped condition, when pressurized oil is supplied to the hydraulic chamber 53 for locking, the inner sleeve 61 undergoes a downward displacement by a distance corresponding to the advancing stroke, and the inner sleeve 61 is in a condition of being received by the housing 9 via the coned disc spring 25 (a condition corresponding to that of FIG. 9 in the first embodiment, although not illustrated). In this condition, an inner periphery of the compressed coned disc spring 25 comes into close contact with the annular projection 28, thereby closing the detection hole 29. The pressure will rise upon supply of compressed air to the detection hole 29, thereby making it possible to detect the clamped condition.

It is noted that, as compared with the structure of the first embodiment, the second embodiment is constructed in such a way that the outer sleeve 71 is strongly wedge-engaged with the inner sleeve 61 to expand radially, thereby making it possible to detect indirectly a condition in which the outer sleeve 71 comes into strong and close contact with the inner peripheral surface of the insertion hole 5.

In the second embodiment, no detection nozzle hole 59 illustrated in FIG. 4 is formed on the support surface 9a. However, the second embodiment may be constructed so as to have both the detection hole 29 and the detection nozzle hole 59.

Third Embodiment

Figure 11:
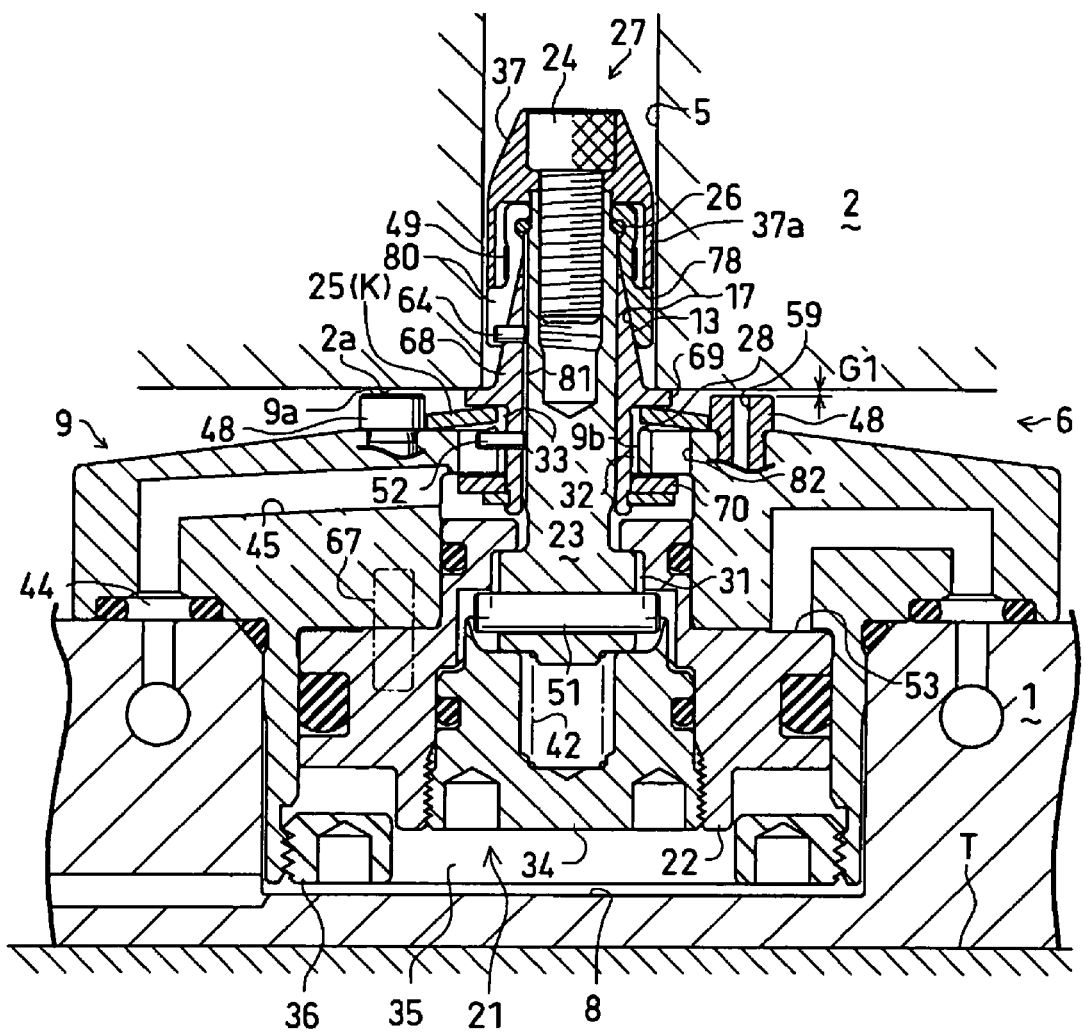
FIG. 11 is an elevational sectional view of the clamping apparatus in a third embodiment and similar to FIG. 4.

FIG. 11 is an elevational sectional view of the clamping apparatus in the third embodiment and similar to FIG. 4.

In the plug means 6 of the third embodiment, no annular central pillar 12 given in FIG. 4 is formed on a housing 9 and, instead, a through hole 9b is formed on the housing 9 in an axial direction. Further, the piston 22 which is to be inserted into the housing 9 is formed into a cylindrical shape. In addition, into a lower part of the housing 9 is screwed an annular screw cylinder 36 in a height adjustable manner.

A piston rod 23 is constructed with members different from those for constructing the piston 22. Into an upper half of the cylindrical hole of the piston 22, a lower half of the piston rod 23 extending vertically is inserted radially movably and axially unmovably. More specifically, between an outer peripheral surface of the lower half of the piston rod 23 and the piston 22 is formed a first annular gap 31. To smoothly move the piston rod 23 radially, a cover volt 34 is screwed into the lower half of the cylindrical hole of the piston 22 in a height adjustable manner, and a balancing spring 42 is attached between the cover volt 34 and the piston rod 23. An upward elastic force of the balancing spring 42 and the weight of the piston rod 23 and the like are intentionally balanced. Additionally, rotation of the piston rod 23 around its axis is blocked by a stopper pin 51.

On an outer periphery of the piston rod 23 is supported a cylindrical inner engaging member 68 as an inner member vertically movably. Unlike the inner sleeve 61 of the first embodiment, the inner engaging member 68 does not form a slit circumferentially. A second annular gap 32 is formed between an outer peripheral surface of the lower half of the inner engaging member 68 and a through hole 9b of the housing 9, by which the inner engaging member 68 is radially movably with respect to the housing 9. Rotation of the inner engaging member 68 around its axis is blocked by a stopper pin 52.

A vertical passage 81 for compressed air for cleaning described later is formed between an outer peripheral surface of the upper half of the piston rod 23 and an inner peripheral surface of the inner engaging member 68.

On an outer peripheral surface of the inner engaging member 68 is formed an inclined outer surface 13 which gradually gets closer to the axis upward. Further, on a lower side of the inclined outer surface 13 is formed a flange portion 69 integrally in a projected manner.

Between an upper surface of the housing 9 and the flange portion 69 is arranged the coned disc spring 25. The coned disc spring 25 is constructed so as to advance the inner engaging member 68 upward. Further, the coned disc spring 25 covers openings such as the through hole 9b of the housing 9 and the vertical hole 82 described later from an upper side. Further, a stopper 70 is provided at a lower part of the inner engaging member 68 and below the flange portion 69, and the stopper 70 serves to prevent the inner engaging member 68 from being raised at a distance greater than a predetermined distance. Further, between an inner peripheral surface of the coned disc spring 25 and the inner engaging member 68 is formed a third annular gap 33.

A plurality of outer engaging members 78 as outer members are arranged on an outer periphery of the inner engaging member 68 circumferentially at intervals. Each of the outer engaging members 78 is constructed so as to be inserted into the insertion hole 5 of the pallet 2. On each of these outer engaging members 78 is formed the inclined inner surface 17 which is opposed to the inclined outer surface 13 of the inner engaging member 68. The inclined inner surface 17 is formed in a tapered manner which gradually gets closer to the axis upward, as with the inclined outer surface 13. Therefore, it is possible that a plurality of the outer engaging members 78 are wedge-engaged with the inner engaging member 68 from an upper side.

To these outer engaging members 78 is connected the leading end of the piston rod 23. More specifically, at an upper part of the piston rod 23 is fixed the cap 37 by means of the bolt 24. Further, to the upper part of the piston rod 23 is attached the ring 26. Then, between an upper part of the cap 37 and the ring 26 is inserted a flange part of the upper end of the outer engaging member 78 radially movably and vertically relatively unmovably.

Further, on the outer periphery of the inner engaging member 68 is fixed the second stopper pin 64 in an outward projecting manner. A projecting portion of the second stopper pin 64 is inserted into a gap 80 formed between the adjacent outer engaging members 78 and 78, by which a plurality of the outer engaging members 78 are guided vertically. In addition, a ring-shaped flat spring (return means) 49 is attached to outer peripheral surfaces of the plural outer engaging members 78. The flat spring 49 constantly urges each of the outer engaging members 78 radially inward.

Additionally, an annular cylindrical part 37a provided at the lower half of the cap 37 covers the flange part of the upper end of the outer engaging member 78 and the flat spring 49.

In the present embodiment, the plug portion 27 includes the leading end of the piston rod 23, the inner engaging member 68, the outer engaging member 78, the cap 37 and the bolt 24. In this instance, since the piston rod 23 is constructed radially movably, the axis of the plug portion 27 is movably in a radial direction of the plug portion 27 with respect to the base plate 1.

Four support rods 48 are press-fitted circumferentially at intervals into an upper surface of the housing 9. On the upper surface of each of the support rods 48 is formed the flat support surface 9a. The support surface 9a is to receive the supported surface 2a of the pallet 2.

In one of the four support rods 48 is opened the detection nozzle hole 59. The detection nozzle hole 59 is adapted so as to supply compressed air for detection. When the supported surface 2a comes into contact with the support surface 9a, the pressure inside the detection nozzle hole 59 rises. It can be confirmed that the pallet 2 is seated on the support rod 48 by detecting the pressure rise using a pressure switch or the like.

The compressed air supplied to the cleaning port 44 passes through the cleaning passage 45 and the vertical passage 81 formed on the outer peripheral surface of the piston rod 23 in the recited order, and is discharged outward radially from the gap 80. Therefore, the discharged compressed air is able to blow foreign matter attached on respective parts such as the support surface 9a of the support rod 48 and clean them.

In addition, the compressed air for cleaning is also supplied to a vertical hole 82 opened in the peripheral wall of the through hole 9b on the housing 9. The compressed air supplied to the vertical hole 82 is dischargeable horizontally from a gap between the upper surface of the coned disc spring 25 and the flange portion 69 or from a gap between the lower surface of the coned disc spring 25 and the housing 9.

Additionally, in the present embodiment is omitted the jet hole 38 (refer to FIG. 4) constructed in the first embodiment, namely, the construction for detecting the fact that the outer peripheral surface of the outer engaging member 78 comes into contact with the inner peripheral surface of the insertion hole 5 by using compressed air.

The operation of the plug means 6 is similar to that described in the first embodiment, excluding the following three points from (A) through (C).

(A) In an unclamped condition, in the first embodiment, the outer sleeve 71 is switched to a radially contracted condition by its own elasticity, while in the present embodiment, instead of the elasticity, the outer engaging member 78 is switched to a radially contracted condition by the elastic force of the flat spring 49.

(B) In the first embodiment, when the pallet 2 is lowered, the lower surface is placed on the coned disc spring 25, while in the present embodiment, the lower surface of the pallet 2 is placed on the flange portion 69 instead.

(C) In the first embodiment, when the outer sleeve 71 comes into close contact with the insertion hole 5, the pallet 2 is positioned horizontally and precisely. In the present embodiment, however, a horizontal movement of the piston rod 23 in relation to the base plate 1 (in other words, a horizontal movement of the plug portion 27) is allowed by the first through the third annular gaps 31 to 33. More specifically, the clamping apparatus of the present embodiment give only a vertical (axial) restriction (clamping) to the pallet 2 or does not have the function of the horizontal positioning as found in the first embodiment. In other words, the clamping apparatus of the present embodiment is a clamping apparatus which allows a large axial misalignment between the plug portion 27 and the insertion hole 5.

FIG. 11 illustrates an unclamped condition where the pallet 2 is lowered to insert the plug portion 27 of the plug means 6 into the insertion hole 5 of the pallet 2 and the lower surface of the pallet 2 is also placed on the flange portion 69.

In this condition, the flange portion 69 and the coned disc spring 25 will support the weight of the pallet 2, and as with the first embodiment, a slight gap G1 is formed between the supported surface 2a and the support surface 9a. Therefore, even when compressed air is supplied to the detection nozzle hole 59 in this condition, pressure will not rise due to air leakage from the gap G1. Namely, the present embodiment is constructed so as to avoid a pressure rise of the detection nozzle hole 59 in an unclamped condition.

As explained above, the clamping apparatus of the present embodiment is provided with a flange portion 69, and the flange portion 69 comes into contact with the periphery of the opening end of the insertion hole 5 of the pallet 2 and also transmits the elastic force of the coned disc spring 25 serves as the gap supporting member K to the pallet 2. Therefore, the clamping apparatus having a compact construction equipped with the flange portion 69 alone is able to transmit a force of the coned disc spring 25 to the pallet 2 reliably. Further, it is also constructed in such a way that the flange portion 69 comes into contact with the periphery of the opening end of the insertion hole 5, thereby the shape of the insertion hole 5 can be simplified. In addition, since the coned disc spring 25 does not come into direct contact with the pallet 2, the coned disc spring 25 can be protected and the service life thereof can be increased.

Fourth Embodiment

Figure 12:
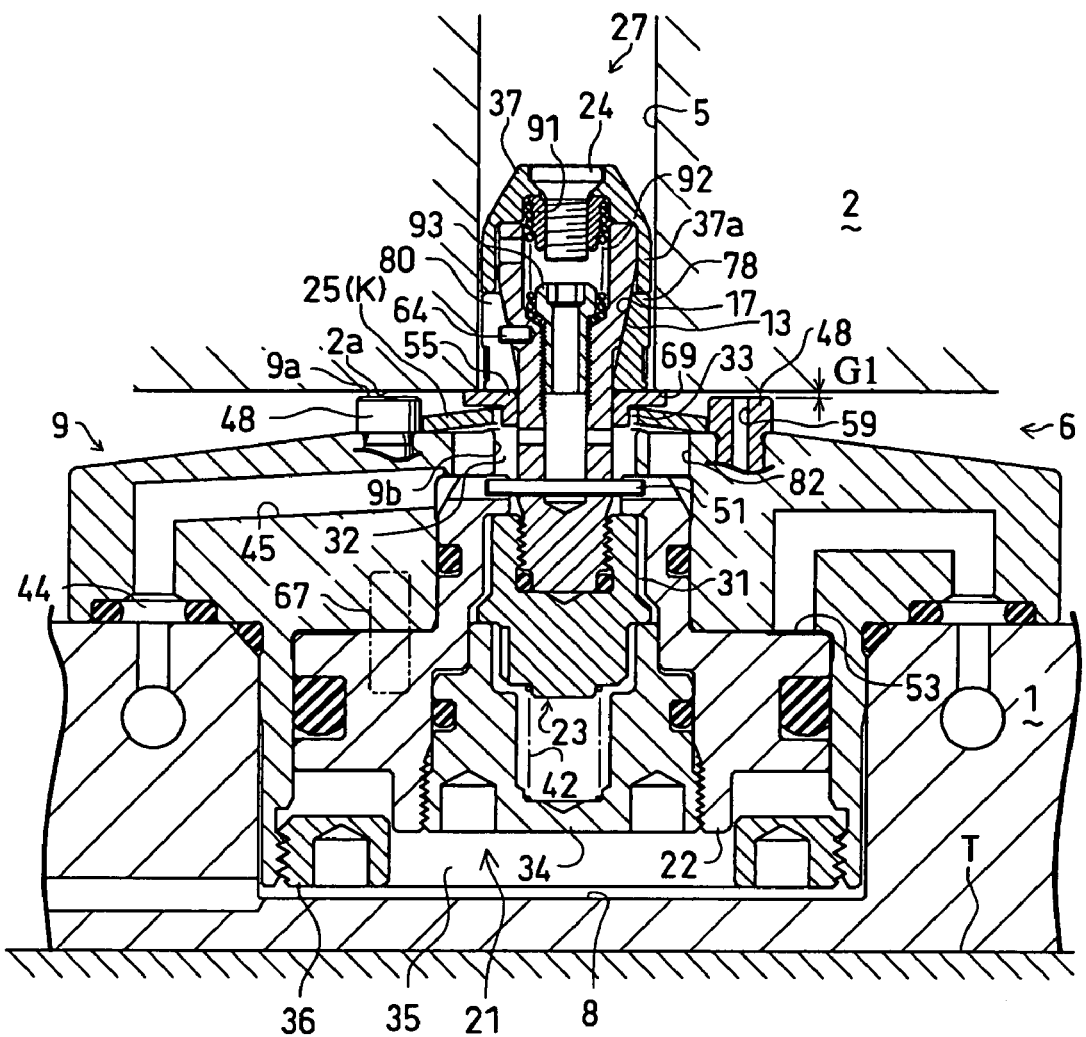
FIG. 12 is an elevational sectional view of the clamping apparatus in a fourth embodiment and similar to FIG. 4.
Figure 13:
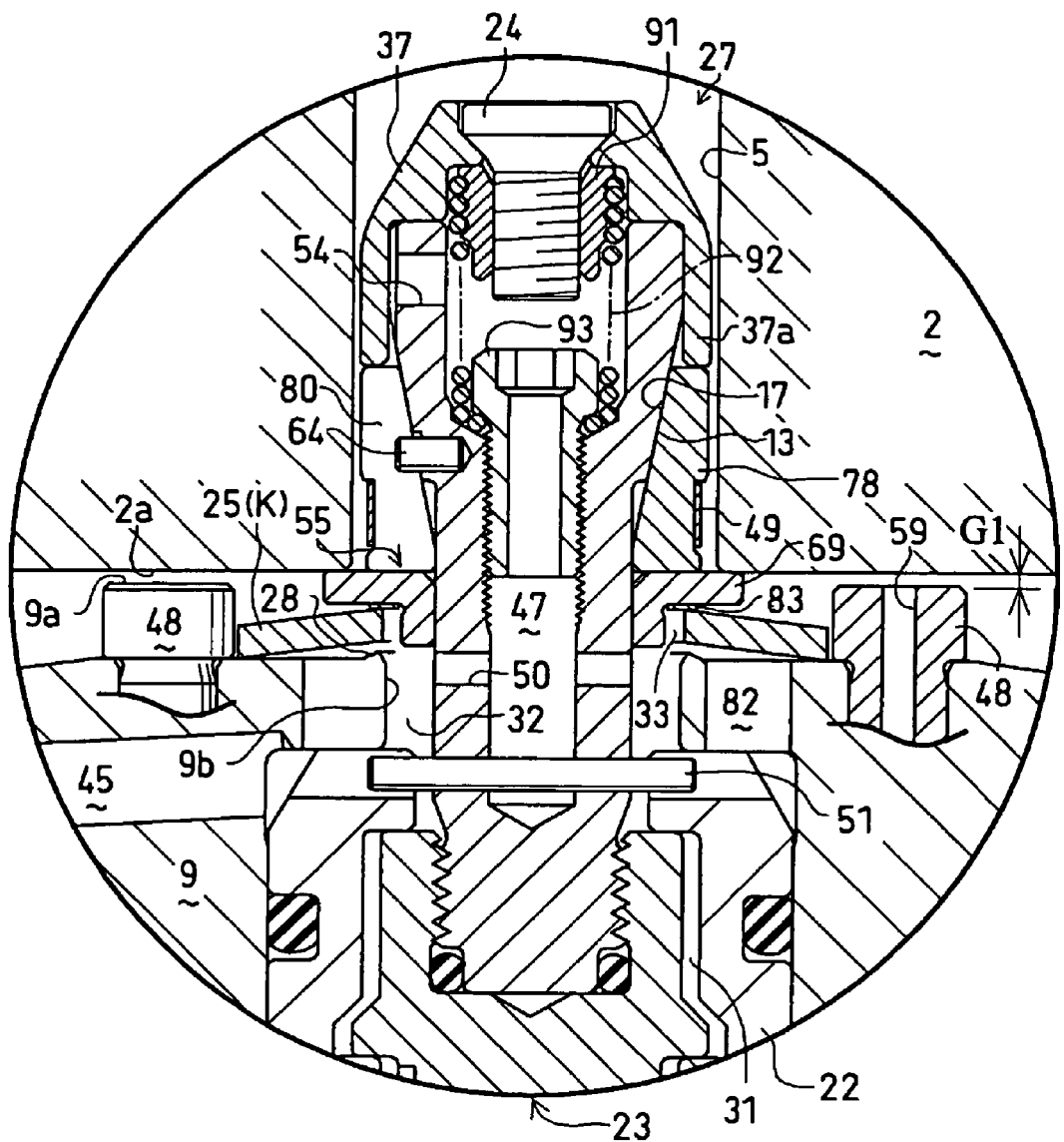
FIG. 13 is an enlarged view illustrating major parts of the plug portion of the clamping apparatus in the fourth embodiment.

FIG. 12 and FIG. 13 illustrate a fourth embodiment. FIG. 12 is an elevational sectional view of the clamping apparatus and similar to FIG. 4. Further, FIG. 13 is an enlarged view illustrating major parts of the plug portion 27.

The present embodiment is constructed as a modified example of the third embodiment. The present embodiment is mainly different from the third embodiment in that the inner engaging member 68 is omitted, the inclined outer surface 13 is formed on the outer peripheral surface of the piston rod 23, the inclined outer surface 13 and the inclined inner surface 17 are formed in reverse vertically, and the coned disc spring 25 urges the outer engaging member 78 toward an advancing direction.

Hereinafter, a specific explanation will be made for the fourth embodiment. The piston rod 23 is constructed by connecting the upper and lower two members with screws. As with the third embodiment, the lower half of the piston rod 23 is inserted into the upper half of the cylindrical hole of the piston 22 radially movably and axially unmovably.

At the upper part of the piston rod 23 is supported a cap 37 vertically movably. A spring seat 91 is fixed on the cap 37 with the bolt 24. The upper part of the piston rod 23 is formed to be hollow, inside which a tension spring 92 is arranged. The upper part of the tension spring 92 is fixed to the spring seat 91. The lower part of the tension spring 92 is fixed to the head of a cylindrical stopper bolt 93. The stopper bolt 93 is screwed onto the piston rod 23 from the upper side.

On the outer peripheral surface of the piston rod 23 is formed the tapered inclined outer surface 13 which gradually gets closer to the axis downward (toward the base end).

A plurality of outer engaging members 78 are arranged as outer members on an outer periphery of the piston rod 23 below the cap 37 circumferentially at intervals. Each of the outer engaging member 78 is constructed so that it can be inserted into the insertion hole 5 of the pallet 2. On the inner peripheral surface of the outer engaging member 78 is formed the tapered inclined inner surface 17 which gradually gets closer to the axis downward (toward the base end).

In the present embodiment, the outer engaging members 78 are formed as a plurality of members (four members in the present embodiment) divided circumferentially. Below the outer engaging members 78 and at the piston rod 23 is supported a sleeve 55 vertically movably. On the sleeve 55 is formed the flange portion 69 in a projecting manner. The coned disc spring 25 is arranged between the flange portion 69 and the housing 9. More specifically, in the present embodiment, the coned disc spring 25 urges the outer engaging members 78 via the sleeve 55 to an advancing direction.

To the upper end surface of each of the outer engaging members 78 is opposed the lower end portion of the cylindrical part 37a which is integrally formed on the cap 37. Further, the sleeve 55 and the coned disc spring 25 cover the lower surface of each of the outer engaging members 78 from the lower side and also cover the through hole 9b of the housing 9 and the vertical hole 82 for cleaning from the upper side. In addition, as illustrated in FIG. 13, a height-adjusting shim 83 is attached between the sleeve 55 and the coned disc spring 25.

Then, the inclined outer surface 13 of the piston rod 23 is wedge-engaged with the inclined inner surface 17 of the plurality of outer engaging members 78 from the upper side.

As illustrated in FIG. 13, inside the piston rod 23 is formed a cylindrical hole 47. Further, on the piston rod 23 is formed a horizontal passage 50 radially. The inner end of the horizontal passage 50 is connected to the cylindrical hole 47, and the outer end thereof is opened in the outer peripheral surface of the piston rod 23. At the position near the upper end of the piston rod 23 is formed a supply passage 54 radially.

In the construction explained above, compressed air supplied to the cleaning passage 45 passes through the horizontal passage 50 and is supplied to the cylindrical hole 47 inside the piston rod 23. Then, the compressed air passes inside the stopper bolt 93 and is led to the supply passage 54. Thereafter, the compressed air is led to the gap 80 from a gap between an inner peripheral surface of the cylindrical part 37a of the cap 37 and the piston rod 23 and is discharged outward from the gap 80.

Now, an explanation will be made for the operation of the plug means 6 in the fourth embodiment.

At first, the plug means 6 is kept unclamped, and in this condition the lower surface of the pallet 2 (periphery of the opening end of the insertion hole 5) is placed on the flange portion 69 of the sleeve 55. In this condition, the lower surface of the pallet 2 is received via the flange portion 69 by the coned disc spring 25, and the gap G1 is formed between the support surface 9a and the supported surface 2a. Therefore, in the unclamped condition, when compressed air is supplied to the detection nozzle hole 59, there is no pressure rise of the detection nozzle hole 59 due to air leakage from the gap G1.

In order to change the plug means 6 from an unclamped condition to a clamped condition, pressurized oil is supplied to the hydraulic chamber 53 for locking. Then, the piston rod 23 connected to the piston 22 is lowered, and the inclined outer surface 13 is also lowered. The outer engaging member 78 is received by the sleeve 55 and the coned disc spring 25. As a result, the inclined inner surface 17 of the outer engaging member 78 makes a tapering engagement with the inclined outer surface 13 of the piston rod 23, and the outer engaging member 78 undergoes an expanding displacement against the urging force of the flat spring 49, and comes into close contact with the inner peripheral surface of the insertion hole 5 on the pallet 2.

Subsequently, the outer engaging member 78, which keeps in close contact with the inner peripheral surface of the insertion hole 5, pulls downward the pallet 2 via the insertion hole 5, and at the same time the outer engaging member 78 is lowered against the urging force of the coned disc spring 25. Thereby, the supported surface 2a of the pallet 2 is brought into contact with the support surface 9a of the housing 9 and the supported surface 2a is also pressed toward the support surface 9a.

Thereafter, with respect to the insertion hole 5 of the pallet 2, the descent thereof is prevented by the support surface 9a, the outer engaging member 78 descends with a frictional slide. When the outer engaging member 78 descends by a distance corresponding to the advancing stroke against the urging force of the coned disc spring 25, the outer engaging member 78 is received by the housing 9 via the coned disc spring 25. Then, the outer engaging member 78 is strongly wedge-engaged with the piston rod 23 to expand radially, and the outer engaging member 78 comes into strong and close contact with the inner peripheral surface of the insertion hole 5. As a result, the pallet 2 is restricted vertically and locked strongly. In the clamped condition, the supported surface 2a is brought into contact with the support surface 9a and pressed, the pressure rises upon supply of compressed air to the detection nozzle hole 59.

In the present embodiment, the coned disc spring 25 as the gap supporting member K also serves to support the outer engaging member 78 as an outer member at the leading end position via the sleeve 55. Therefore, it is not necessary to provide a special means for supporting the outer engaging member 78 at the leading end. Therefore, the clamping apparatus is simply constructed and reduced in the number of components.

Fifth Embodiment

Figure 14:
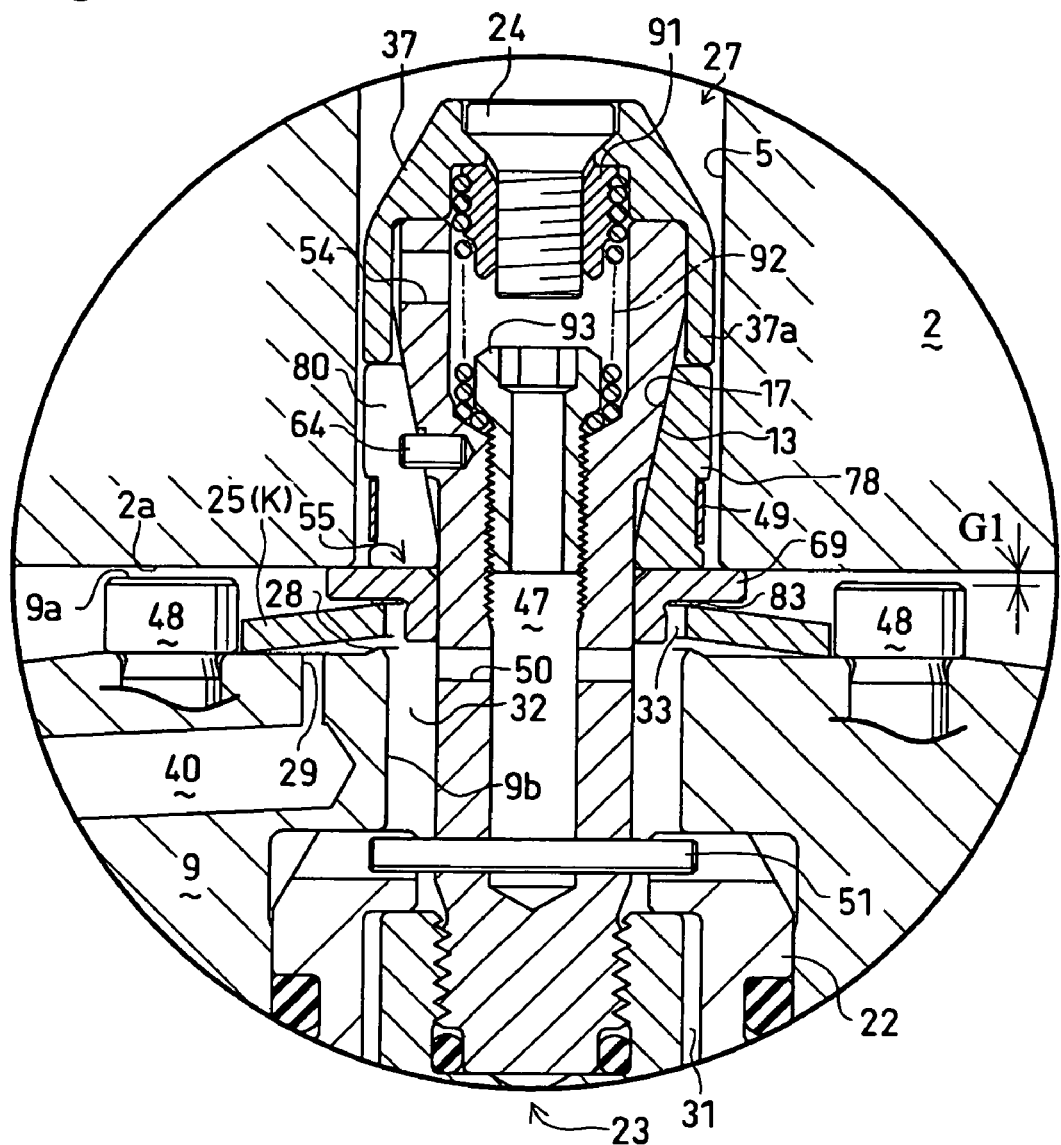
FIG. 14 is an enlarged view illustrating major parts of an elevational sectional view of the clamping apparatus in a fifth embodiment and similar to FIG. 13.

FIG. 14 is an enlarged view illustrating major parts of the elevational sectional view of the clamping apparatus in the fifth embodiment and similar to FIG. 13. The fifth embodiment corresponds to a combination of the fourth embodiment (refer to FIG. 13) with the second embodiment (refer to FIG. 10).

More specifically, as with the fourth embodiment, the present invention is constructed so that a detection hole 29 is opened in the upper surface of the peripheral wall of the through hole 9b and the coned disc spring 25 covers the upper part of the detection hole 29. The air passage 40 is connected to the detection hole 29 for the supply of compressed air. The operation of the present embodiment is similar to that of the fourth embodiment and of the second embodiment.

Sixth Embodiment

Figure 15:
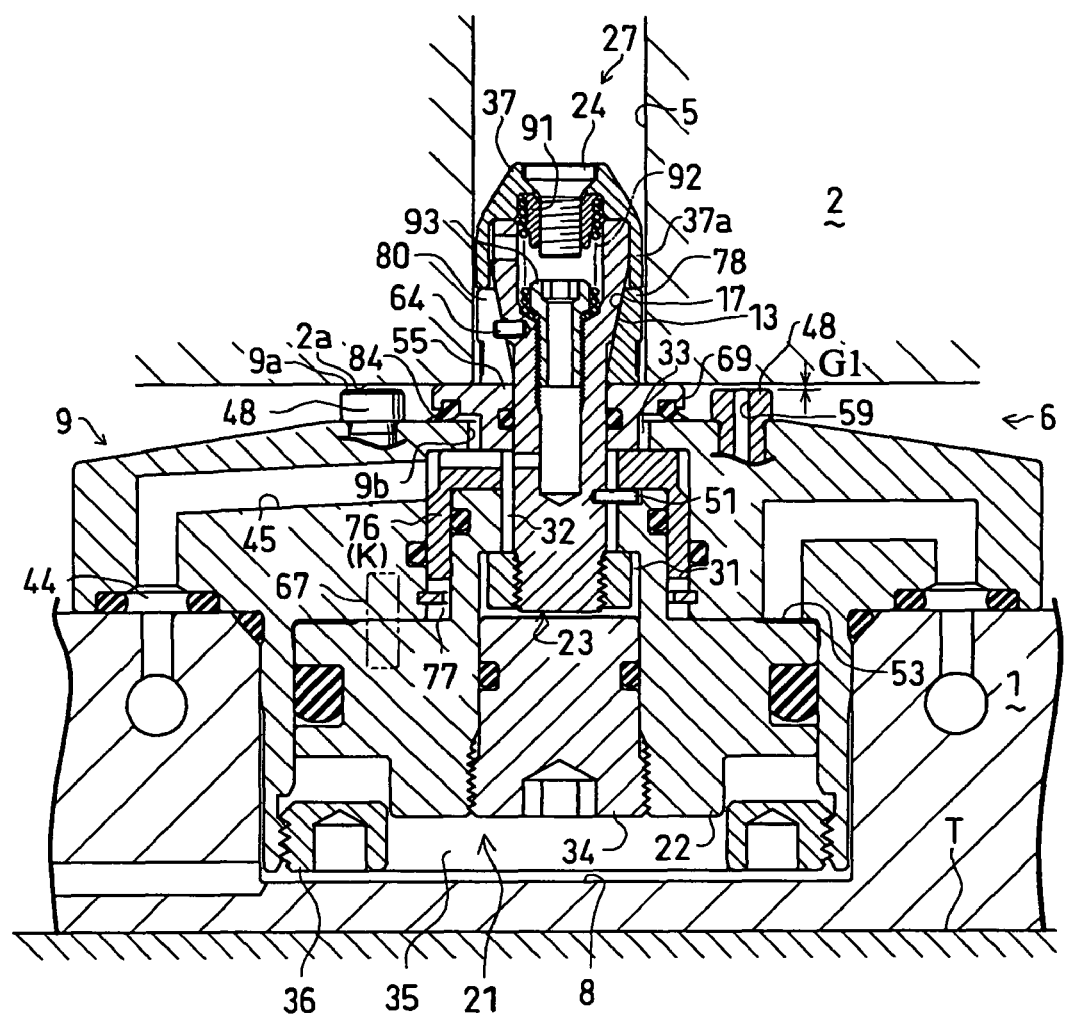
FIG. 15 is an elevational sectional view of the clamping apparatus in a sixth embodiment and similar to FIG. 12.

FIG. 15 is an elevational sectional view of the clamping apparatus in a sixth embodiment and similar to FIG. 12. The sixth embodiment is constructed as a modified example of the fourth embodiment. The present embodiment is different from the fourth embodiment in that the sleeve 55 is adapted to be advanced by using a push-up piston 76 described later.

Hereinafter, a specific explanation will be made for the present embodiment. Into the upper part of the cylindrical hole of the housing 9 is hermetically inserted an annular push-up piston 76. The push-up piston 76 is hermetically fitted into the upper part of the piston 22 and also comes into contact with the sleeve 55 from the lower side.

An operation chamber 77 is formed between the push-up piston 76 and the piston 22. The operation chamber 77 is communicated to the hydraulic chamber 53 for locking.

Further, to the lower surface of the flange portion 69 of the sleeve 55 is attached a lip 84 made from synthetic resin. The lip 84 comes into contact with the upper surface of the housing 9 hermetically, thereby preventing foreign matter and the like from intruding into the housing 9 via the through hole 9b.

In the construction described above, when pressurized oil is supplied to the hydraulic chamber 53 for locking on the locking operation, from the beginning of supply of the pressurized oil to the first half period of such supply, a plurality of the outer engaging members 78 are kept at an upper advancing position via the push-up piston 76 and the flange portion 69 of the sleeve 55 by means of an upward hydraulic pressure acting on the push-up piston 76 from the operation chamber 77. In this condition, a gap G1 is formed between the supported surface 2a of the pallet 2 which is kept placed on the flange portion 69 of the sleeve 55 and the support surface 9a. Therefore, even when compressed air is supplied to the detection nozzle hole 59, there is no pressure rise of the detection nozzle hole 59 due to air leakage from the gap G1.

Then, during the latter half period of supplying the pressurized oil, a large hydraulic force acting on a large area of the piston 22 lowers a plurality of the outer engaging members 78, while strongly expanding them, via the piston rod 23 against an upward force acting on the push-up piston 76. Therefore, the pallet 2 is also pulled downward, and the supported surface 2a comes into contact with the support surface 9a (more specifically, the gap G1 is eliminated). In this condition, when compressed air is supplied to the detection nozzle hole 59, the pressure will rise.

Additionally, in the sixth embodiment a plurality of the outer engaging members 78 are supported by the housing 9 via the sleeve 55, the push-up piston 76 and pressurized oil in the operation chamber 77.

In the present embodiment, the push-up piston 76 corresponds to the gap supporting member K. More specifically, the gap supporting member K is constructed as a piston actuated by a pressurized fluid (pressurized oil in the present embodiment). Therefore, in an unclamped condition, making it possible to easily change a pushing-up force separating the pallet 2 from the base plate 1, which forms the gap G1 between the supported surface 2a and the support surface 9a, by adjusting the pressure of the pressurized oil.

Exemplified Variation

A plurality of examples of the embodiments in the present invention have been described above. The present invention can be carried out by modifications as given in the following (1) to (7).

(1) The coned disc spring 25 exemplified in the first embodiment through the fifth embodiment can be replaced by a coil spring or an elastic member such as rubber. Further, the insertion hole 5 may be available in a different shape such as a circular tapered hole, instead of the exemplified circular straight hole.

(2) In the clamping apparatus, the pallet 2 may take any position with the base plate 1. For example, positioning may be made by arranging the pallet 2 and the base plate 1 respectively on the right and the left and actuating the pallet 2 horizontally. In this instance, the clamping apparatus may be arranged so that the plug portion 27 faces horizontally. It may also be arranged so that the pallet 2 is attached or detached obliquely with respect to the base plate 1.

(3) Before the condition of FIG. 2, the pallet 2 may be actuated horizontally. More specifically, at a stage before the pallet 2 is lowered in relation to the base plate 1, the pallet 2 is moved horizontally and the insertion hole 5 is approximately aligned with the plug portion 27 to provide a condition of FIG. 2. Thereafter, as described above, the pallet 2 may be lowered. In the clamping apparatus, the base plate 1 may be actuated horizontally instead of actuating the pallet 2 horizontally.

(4) The support surface 9a may be directly and integrally formed on the base plate 1 instead of being formed on the housing 9. The supported surface 2a may be formed on another member fixed to the pallet 2, instead of being formed on the lower surface of the pallet 2.

(5) In the embodiments described above, only one detection nozzle hole 59 is formed, but a plurality of the nozzle holes 59 may be formed.

(6) In the embodiments described above, a pressurized fluid supplied to the detection nozzle hole 59 is compressed air. However, another fluid may be used, and, for example, cutting oil and the like may be supplied to the detection nozzle hole 59.

(7) The combination of the first block and the second block may be the combination of a table of a machine tool and a work pallet, the combination of a work pallet and a jig base, the combination of a jig base and a work piece, or the combination of a working jig such as a welding jig and a working article such as a work piece, instead of the combination of the base plate 1 and the pallet 2 presented as an example. Further, the combination may be the set of a board of an injection molding machine or of a pressing machine and a mold. In addition, the present invention is applicable to positioning of a work piece, a tool and the like used in respective processing machines such as a laser beam machine and an electric discharge machine.

What is claimed is:

1. A clamping apparatus configured to be switched between an unclamped condition and a clamped condition, the clamping apparatus comprising;

a plug portion, including a housing, projected from a first block in a leading end direction so as to be inserted into a insertion hole opened in a second block, a support surface formed on the housing so as to be brought into contact with a supported surface formed on the second block, a fluid flow hole opened in the support surface, a gap supporting member provided on the first block so as to push the second block in such a direction as to separate the second block from the first block and to form a gap between the supported surface and the support surface, the gap supporting member configured to push the second block via a receiving portion in the leading end direction beyond the support surface when the apparatus is in the unclamped condition to form the gap between the supported surface and the support surface, wherein said receiving portion comes into contact with a portion of a bottom surface of the second block and wherein said portion of the bottom surface of the second block includes a circumferential opening that has a circumference the same as a circumference of an opening end of the insertion hole, and a pull member eliminating the gap by making the second block approach the first block against a pushing force of the gap supporting member in such a condition that an outer peripheral surface of the plug portion is brought into close contact with an inner peripheral surface of the insertion hole in a radial direction.

2. The clamping apparatus as set forth in claim 1, wherein the first block is arranged below the second block, and the gap supporting member forms the gap between the supported surface and the support surface by supporting a weight of the second block.

3. The clamping apparatus as set forth in claim 1, wherein pressurized fluid is jetted out from the fluid flow hole.

4. The clamping apparatus as set forth in claim 1, wherein an elastic member is employed as the gap supporting member.

5. The clamping apparatus as set forth in claim 1, wherein when the outer peripheral surface of the plug portion comes into close contact with the inner peripheral surface of the insertion hole, the second block is positioned with respect to the first block in a radial direction of the plug portion.

6. The clamping apparatus as set forth in claim 1, wherein the plug portion is provided with an outer member having an inclined inner surface vertically movably, the pull member is configured to make the second block approach the first block via the outer member and the insertion hole, radially expanding the outer member to make the outer member come into close contact with the insertion hole by a tapering engagement of the inclined inner surface.

7. The clamping apparatus as set forth in claim 6, wherein the gap supporting member also serves to hold a member having an inclined outer surface allowed to make a tapering engagement with the inclined inner surface of the outer member at a leading end position.

* * * * *